(12) United States Patent
Giacalone et al.

(10) Patent No.: US 6,487,576 B1
(45) Date of Patent: Nov. 26, 2002

(54) ZERO ANTICIPATION METHOD AND APPARATUS

(75) Inventors: Jean-Pierre Giacalone, Vence (FR); Herve Catan, Saint Laurent du Var (FR); Anne Lombardot, Chateau Neul de Grasse (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/411,466

(22) Filed: Oct. 1, 1999

(30) Foreign Application Priority Data

Oct. 6, 1998 (EP) .............................. 98402455
Oct. 6, 1998 (EP) .............................. 98402457

(51) Int. Cl.$^7$ .............................................. G06F 7/00
(52) U.S. Cl. ........................................... 708/525
(58) Field of Search .......................................... 708/525

(56) References Cited

U.S. PATENT DOCUMENTS

| | | | |
|---|---|---|---|
| 5,367,477 A | 11/1994 | Hinds et al. | 364/736.5 |
| 5,754,458 A | 5/1998 | Beraha et al. | 364/748.03 |
| 6,018,757 A | * 1/2000 | Wong | 708/525 |

OTHER PUBLICATIONS

Hokenek, E., et al.; *Leading–Zero Anticipator (LZA) in the IBM RISC Systems/6000 Floating–Point Execution Unit*, IBM journal of Research and Development, vol. 34, No. 1, Jan. 1, 1990, pp. 71–77.

Suzuki, K., et al.; *A 2.4–ns, 16–BIT, 0.5–μm CMOS Arithmetic Logic Unit for Microprogrammable Video Signal Processor LSIs*, Proc. Of the Custom Integrated Circuits Conf., San Diego, May 9–12, 1993, pp. 12.04.01–12.04.04, NEC Corp.

Wei, B.W.Y., et al.; *Area–Time Optimal Adder Design*, IEEE Transactions on Computers, vol. 39, No. 5, May 1, 1990, pp. 666–675.

* cited by examiner

Primary Examiner—Tan V. Mai
(74) Attorney, Agent, or Firm—Gerald E. Laws; W. James Brady, III; Frederick J. Telecky, Jr.

(57) ABSTRACT

A zero anticipation mechanism for an arithmetic unit 42 of a processing engine includes an array of cells 420, 430 interconnected to produce an ordered sequence of intermediate anticipation signals. The array of cells includes cells connected to receive intermediate result signals from the arithmetic unit, cells for forwarding an intermediate anticipation signal supplied thereto, and cells for generating a combination of first intermediate anticipation signals and second intermediate anticipation signals supplied thereto. The zero anticipation mechanism implements a zero look-ahead mechanism which can predict a zero result 479 prior to the arithmetic unit completing an arithmetic operation.

22 Claims, 12 Drawing Sheets

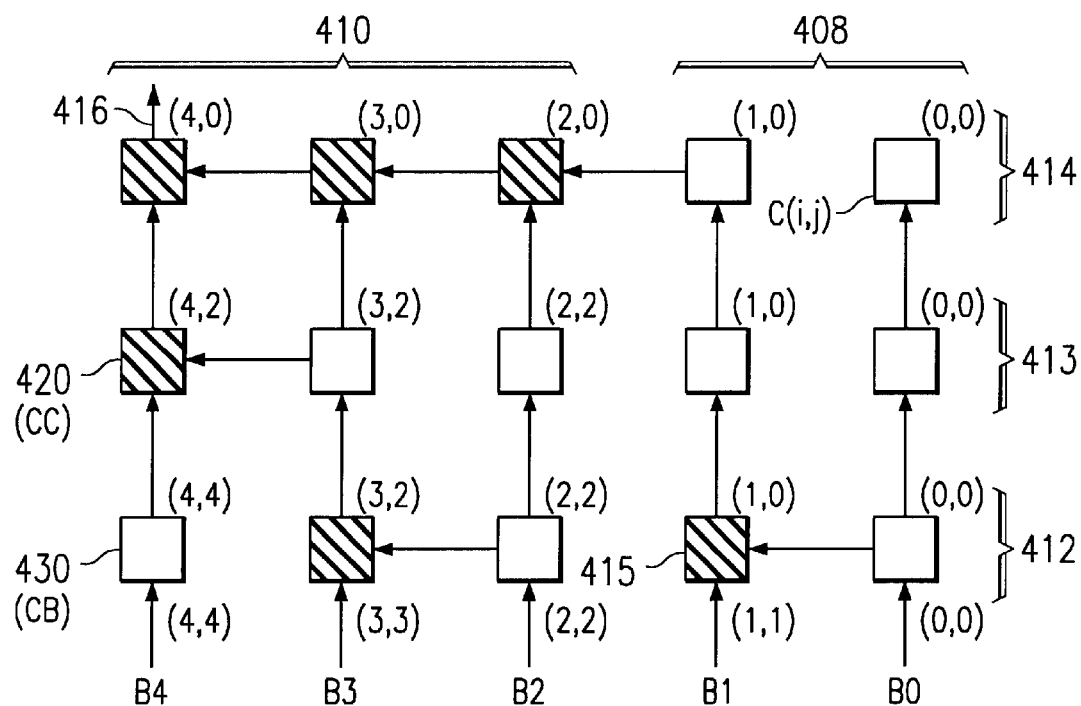
FIG. 9B
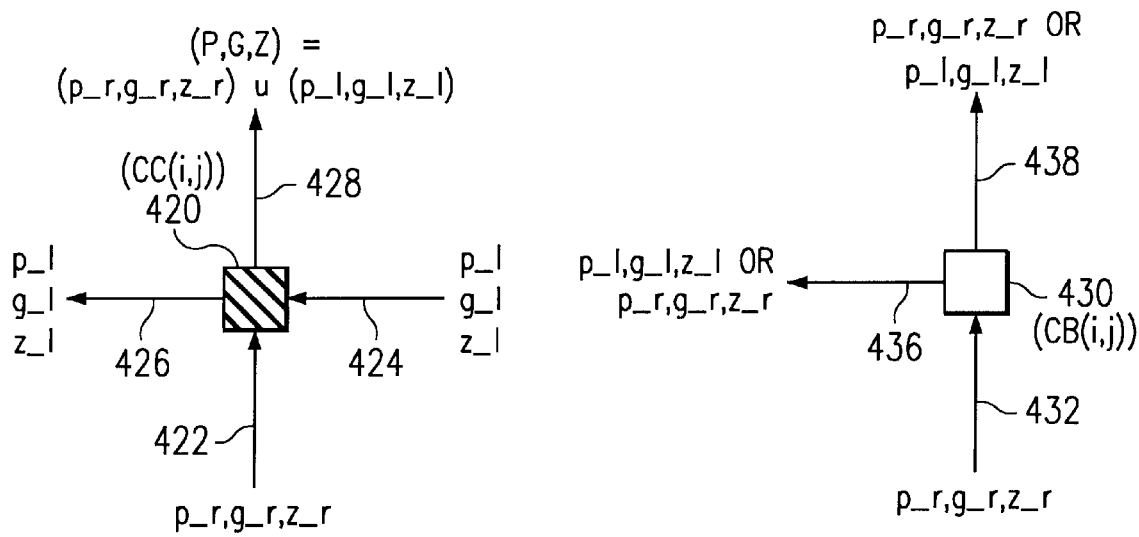
FIG. 10
FIG. 11

ZERO ANTICIPATION METHOD AND APPARATUS

This application claims priority to S.N. 98402457.0, filed in Europe on Oct. 6, 1998 and S.N. 98402455.4, filed in Europe on Oct. 6, 1998.

FIELD OF THE INVENTION

The present invention relates to zero anticipation in the field of computing systems. In particular, the invention relates to a zero anticipation mechanism, to a processing engine and a computing system including such a mechanism and to a method of zero anticipation in such apparatus.

BACKGROUND OF THE INVENTION

Where reference is made to a computing system, it should be understood that this term is intended to relate generally to systems and apparatus which perform computations, including computers and electronic apparatus including processing engines for performing computations, and to the processing engines themselves. Many different types of processing engines are known, including the central processing units of mainframe systems, microprocessors, micro-controllers, digital signal processors and so on.

The performance of a computing system is vitally affected by the speed and accuracy with which arithmetic operations are performed in the processing engine. This is because many of the instructions executed by a processing engine of such a computing system require arithmetic operations. Arithmetic circuitry is often the most complex circuitry in the instruction execution unit of a processing engine in terms of the number of gates and logic levels. In relative terms, therefore, arithmetic operations tend to be slow and prone to error. One important aspect of the result of arithmetic operations is the determination of condition codes.

A condition code will be set by the processing engine to reflect the outcome of an arithmetic operation. This code assists the processing engine in making operational decisions which depend upon arithmetic results. A typical processing engine, such as a microprocessor or a digital signal processor for example, has an arithmetic logic unit (ALU) which performs mathematical operations on two or more "N" bit operands, where "N" represents the total number of bits per operand. It will be convenient in the following to refer to the "i"th bit, where "i" is an index variable whose value is between 0 and N-1 inclusive.

One type of computation result on which a decision, such as for example branch decision, might be made is where the operation result is a zero condition. For example, a branch might be made if the result of a computation is zero, whereas program execution might otherwise continue at the next command. Alternatively, the converse may be true.

Typically, the decision as to whether to take a branch or not will rely on the resolution of the computation result (e.g., whether the result is zero or not). As, however, this may take some time and, also, the branch operation itself will take some time, this can have a not insignificant effect on overall system performance.

Condition codes are also important in some non-arithmetic operations, for example a conditional data operation where the destination of a result will depend upon the resolution of the condition. An example of this could, for example, be a data load instruction involving the generation of data complements. Once again, the time taken to resolve the condition and then to effect the operation dependent thereon can have a not insignificant effect on performance.

The condition code may, for example, be employed to indicate that the result of an operation is greater than zero (GT), less than zero (LT), or equal to zero (EQ). LT is the easiest outcome to detect, because it simply involves examining the sign bit of the result. In general, GT and EQ are more difficult outcomes to detect, because the sign bit of the result is set positive when the result is either zero or a positive quantity. Therefore, examining the sign bit of the result, when the result is equal to zero, does not indicate whether the result is zero or a positive number. However, for the result of a specific instruction on specific data, EQ and GT are mutually exclusive. Thus, determining one is sufficient for the determination of the other, once LT has been excluded.

In adder operation, the traditional method of determining when the result is zero is to NOR all of the output bits of an adder circuit to reduce as fast as possible the output bits to a single output (zero) using a binary tree. However, as many architectures require 32-bit, or wider, data path for fixed point units, they also require adders of 32 bits in width. The NORing all of the output bits may require two or more additional stages of logic, depending on the technology used for implementation. For example, to reduce 32 bits would take five stages with two input NOR gates ($2^5=32$) and three stages with four input NOR gates ($4^3=64$). As higher clock rates are demanded, the addition of logic stages to an adder circuit can result in the condition code becoming critical, thereby forcing completion of its computation into the next machine cycle.

Several solutions have been proposed for determining when a result is zero. For example, U.S. Pat. No. 4,924,422 issued May 8, 1990 to IBM Corporation describes a method and apparatus for determining when a result is zero. This patent determines when two operands are equivalent directly from the operand without the use of an adder. In one embodiment, conditions for the sum being equal to zero are determined from half sum to carry and transmit operators derived from the input operands. These operands are used in some known types of adders and, thus may be provided from a parallel adder to the condition prediction circuitry. In another embodiment, the equations for a carry-save-adder are modified to provide a circuit specifically designed for the determination of the condition when the sum of the operands is equal to zero. This sum is equal to zero circuit reduces the gate delay and gate count allowing the processor central processing unit to determine the condition prior to the actual sum of two operands. This allows the processing engine to react to the condition more quickly, thus increasing overall operating speed.

U.S. Pat. No. 4,815,019, issued Mar. 21, 1989 to Texas Instruments, Inc., describes a method and apparatus for determining when an ALU result is zero. This patent describes a fast ALU=0 circuit that is used with a carry-select look ahead ALU. Preliminary ALU=0 signals are derived for each section of the ALU prior to a carry in signal being received by that section. When the carry in signal is received, a final comparison is made with the least significant bit of the section and the final ALU=0 signal is generated. The ALU=0, computation is completed one gate delay after the ALU computation is completed. The circuit for computing whether the result of an ALU computation is zero determines whether certain bits are zero before the ALU computation is complete. When the final ALU computation is available, only a very small number of bits need be considered to determine whether the result is zero. This determination is made with the insertion of only 1 additional gate delay after the ALU computation is complete.

U.S. Pat. No. 5,508,950, issued Apr. 16, 1996 to Texas Instruments, Inc., describes a circuit and method for detecting when an ALU result is zero. This patent describes a circuit and method for detecting if a sum of a first multi-bit number A of N bits and a second multi-bit number B of N bits equals a third multi-bit number C of N bits prior to availability of the sum of A and B. A propagate signal, a generate signal and a kill signal are generated for each bit in the proposed sum. A zero signal is formed from these signals. The particular manner of forming the zero signal for each bit depends upon the state of the third multi-bit number C for the corresponding bit and the prior bit. The zero signal is an exclusive OR of the corresponding propagate signal $P_n$ and a kill signal $K_{n-1}$ of a prior bit if the current bit and the prior bit of C are "00". The zero signal is an exclusive NOR of the corresponding propagate signal $P_n$ and a generate signal $G_{n-1}$ of a prior bit if the current bit and the prior bit of C are "01". The zero signal is an exclusive NOR of the corresponding propagate signal $P_n$ and a kill signal $K_{n-1}$ of a prior bit if the current bit and the prior bit of C are "10". The zero signal is an exclusive OR of the corresponding propagate signal $P_n$ and a generate signal $G_{n-1}$ of a prior bit if the current bit and the prior bit of C are "11". The sum of A and B equals C if all the zero signals are active "1". The propagate signal, generate signal and kill signal of the various bits can be used to form the sum. This technique provides the equality signal before the carry can ripple through the adder logic.

Accordingly, an aim of the present invention is to provide an improved mechanism and method for determining a zero condition, whereby operational speed of a processing engine of computing system may be increased.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with a first aspect of the invention, there is provided a zero anticipation mechanism for an arithmetic unit of a processing engine. The zero anticipation mechanism comprises an array of cells interconnected to produce an ordered sequence of intermediate anticipation signals. The array of cells includes cells connectable to receive intermediate result signals from the arithmetic unit, cells for forwarding an intermediate anticipation signal supplied thereto and cells for generating a combination of a first intermediate anticipation signal and a second intermediate anticipation signal supplied thereto.

An embodiment of the invention can predict when the result of an arithmetic unit is zero before the result is available. The array of cells derives an algebraic or logical combination of intermediate result signals from an arithmetic unit to predict, or anticipate a zero result not later than the result is available.

In an embodiment of the invention, the array of cells can be arranged in an array with the cells selectively interconnected in first and second directions. The cells can have one or more of: a first input for connection to the output of an adjacent cell in the first direction; a first output for connection to an input of an adjacent cell in the first direction; a second input for connection to the output of an adjacent cell in the second direction; and a second output for connection to an input of an adjacent cell in the second direction.

Different cells in the array have different combinations of inputs and outputs according to their position in the array. A cell with a first input and a first output is operable to transmit a signal received at the first input to the first output without adding delay. A cell for forwarding an intermediate anticipation signal and having a second input and a second output is operable to buffer a signal received at the second input for a predetermined time prior to forwarding the signal from the second output. A cell for forwarding an intermediate anticipation signal and having a second input and a second output is operable to buffer a signal received at the second input for a predetermined time prior to forwarding the signal from the second output. A cell for combining intermediate anticipation signals supplied thereto and having a first input, a second input and at least one of a first output and a second output is operable to combine an intermediate anticipation signal received at the first input with an intermediate anticipation signal received at the second input and to output the combined intermediate anticipation signal from at least one output. The combination can be a logical combination of the input signals. The logical combination can be defined by an operator u, such that:

$$(g\_1, p\_1, z\_1)u(g\_r, p\_r, z\_r) = (g\_1 + (p\_1 \cdot g\_r), p\_1 \cdot p\_r, (z\_1 \cdot z\_r \cdot (\sim g\_r)) + p\_1 \cdot z\_r g\_r),$$

where $g\_1$ and $g\_r$ are first and second generate terms, $p\_1$ and $p\_r$ are first and second propagate terms, $z\_1$ and $z\_r$ are first and second zero anticipation terms.

In an embodiment of the invention, a zero anticipation mechanism for an arithmetic unit providing an arithmetic result having N bits ordered from a lowest bit position to a highest bit position includes a plurality of sub-arrays. Each sub-array is associated with a respective group of adjacent bit positions of the arithmetic result and generates an intermediate anticipation result signal. The intermediate anticipation result signal of a sub-array is forwarded directly to all sub-arrays associated with higher order bit positions.

A global, or final output of a sub-array associated with a highest order bit position forms a zero anticipation signal.

An intermediate zero anticipation signal may also be provided from a sub-array associated with an intermediate bit position. This can provide an intermediate zero anticipation result in respect of bits up to an including the intermediate bit position.

An embodiment of the invention can be implemented for an arithmetic unit operable to perform an arithmetic operation on operands A and B, where each operand comprises an ordered sequence of N bits, A(i) and B(i), respectively, for i=0 to N−1, which includes a carry look-ahead adder for generating the result of the arithmetic operation. In such an implementation, the array of cells can be formed by cells of the carry look-ahead adder.

The arithmetic unit can include a carry-save adder responsive to operands A and B for producing an ordered sequence of intermediate result signals by carry-free combination of operand A with operand B. The zero anticipation mechanism can be connectable to the carry-save adder circuit for generating a zero anticipation signal based on an algebraic combination of carry-in signals from the carry-save adder with the ordered sequence of intermediate result signals for anticipating a zero magnitude result, with the zero anticipation output being generated not later than the result.

In accordance with another aspect of the invention, there is provided a processing engine including an arithmetic unit for providing an arithmetic result and a zero anticipation mechanism as set out above.

Examples of possible types of arithmetic unit are a multiply and accumulate unit, a floating point unit and, more generally any arithmetic and logic unit.

The processing engine could, for example, be a digital signal processor.

In accordance with further aspect of the invention, there is provided an integrated circuit comprising a processing engine as set out above.

In accordance with yet another aspect of the invention, there is provided a a method of anticipating a zero result of an arithmetic unit of a processing engine. The method comprises:

provJapanese input data to the arithmetic unit, generating intermediate result signals for the arithmetic unit; and producing an ordered sequence of intermediate anticipation signals by receiving the intermediate result signals from the arithmetic unit to form intermediate anticipation signals, and selectively forwarding and combining intermediate anticipation signals in accordance with a predetermined algorithm for generating a zero anticipation signal.

BRIEF DESCRIPTION OF THE DRAWINGS

Particular embodiments in accordance with the invention will now be described, by way of example only, and with reference to the accompanying drawings in which like reference signs are used to denote like parts, unless otherwise stated, and in which:

FIGS. 9A and 9B are schematic representations of examples of structures for a zero detection mechanism according to the invention;

FIG. 10 is a schematic representation of a first type of cell of the zero detection mechanism of FIG. 9B;

FIG. 11 is a schematic representation of a second type of cell of the zero detection mechanism of FIG. 9B;

DESCRIPTION OF PARTICULAR EMBODIMENTS

Although the invention finds particular application to Digital Signal Processors (DSPs), implemented for example in an Application Specific Integrated Circuit (ASIC), it also finds application to other forms of processing engines.

Figure 1:
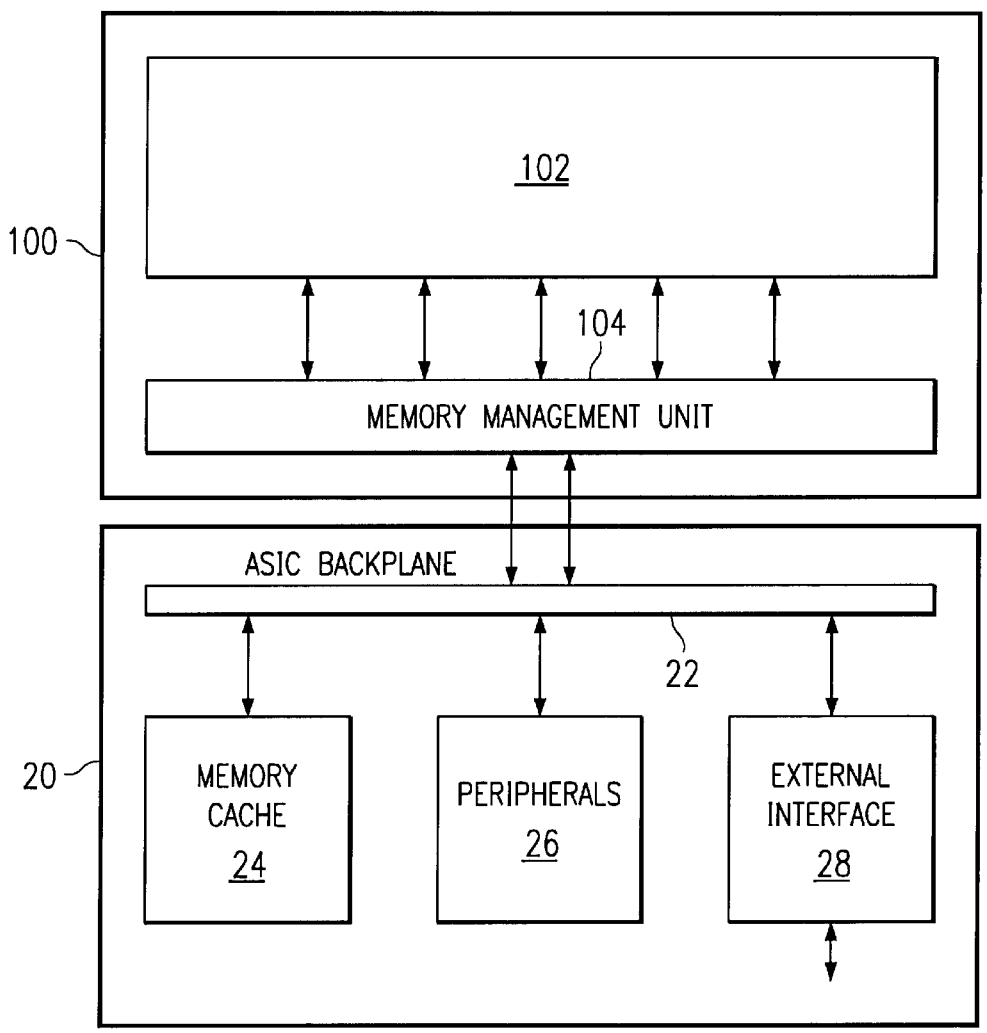
FIG. 1 is a schematic block diagram of a processor in accordance with an embodiment of the invention.

FIG. 1 is a block diagram of a microprocessor 10 which has an embodiment of the present invention. Microprocessor 10 is a digital signal processor ("DSP"). In the interest of clarity, FIG. 1 only shows those portions of microprocessor 10 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 10 relevant to an embodiment of the present invention are explained in sufficient detail hereinbelow, so as to enable one of ordinary skill in the microprocessor art to make and use the invention.

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 6,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

A description of various architectural features and a description of a complete set of instructions of the microprocessor of FIG. 1 is provided in co-assigned application Ser. No. 09/410,977, which is incorporated herein by reference.

The basic architecture of an example of a processor according to the invention will now be described.

FIG. 1 is a schematic overview of a processor 10 forming an exemplary embodiment of the present invention. The processor 10 includes a processing engine 100 and a processor backplane 20. In the present embodiment, the processor is a Digital Signal Processor 10 implemented in an Application Specific Integrated Circuit (ASIC).

As shown in FIG. 1, the processing engine 100 forms a central processing unit (CPU) with a processing core 102 and a memory interface, or management, unit 104 for interfacing the processing core 102 with memory units external to the processor core 102.

The processor backplane 20 comprises a backplane bus 22, to which the memory management unit 104 of the processing engine is connected. Also connected to the backplane bus 22 is an instruction cache memory 24, peripheral devices 26 and an external interface 28.

It will be appreciated that in other embodiments, the invention could be implemented using different configurations and/or different technologies. For example, the processing engine 100 could form the processor 10, with the processor backplane 20 being separate therefrom. The processing engine 100 could, for example be a DSP separate from and mounted on a backplane 20 supporting a backplane bus 22, peripheral and external interfaces. The processing engine 100 could, for example, be a microprocessor rather than a DSP and could be implemented in technologies other than ASIC technology. The processing engine, or a processor including the processing engine, could be implemented in one or more integrated circuits.

Figure 2:
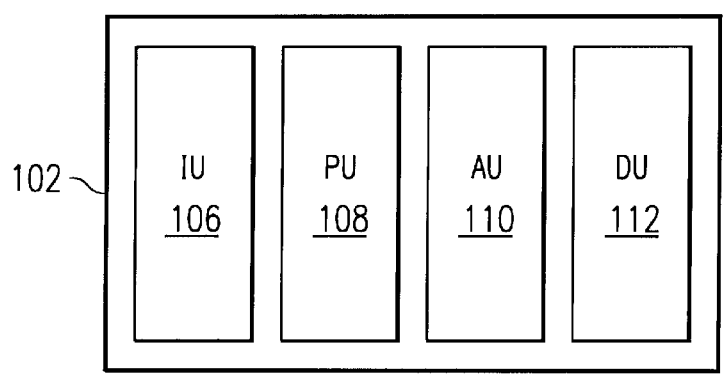
FIG. 2 is a schematic diagram of a core of the processor of FIG. 1.

FIG. 2 illustrates the basic structure of an embodiment of the processing core 102. As illustrated, the processing core 102 includes four elements, namely an Instruction Buffer Unit (I Unit) 106 and three execution units. The execution units are a Program Flow Unit (P Unit) 108, Address Data Flow Unit (A Unit) 110 and a Data Computation Unit (D Unit) 112 for executing instructions decoded from the Instruction Buffer Unit (I Unit) 106 and for controlling and monitoring program flow.

Figure 3:
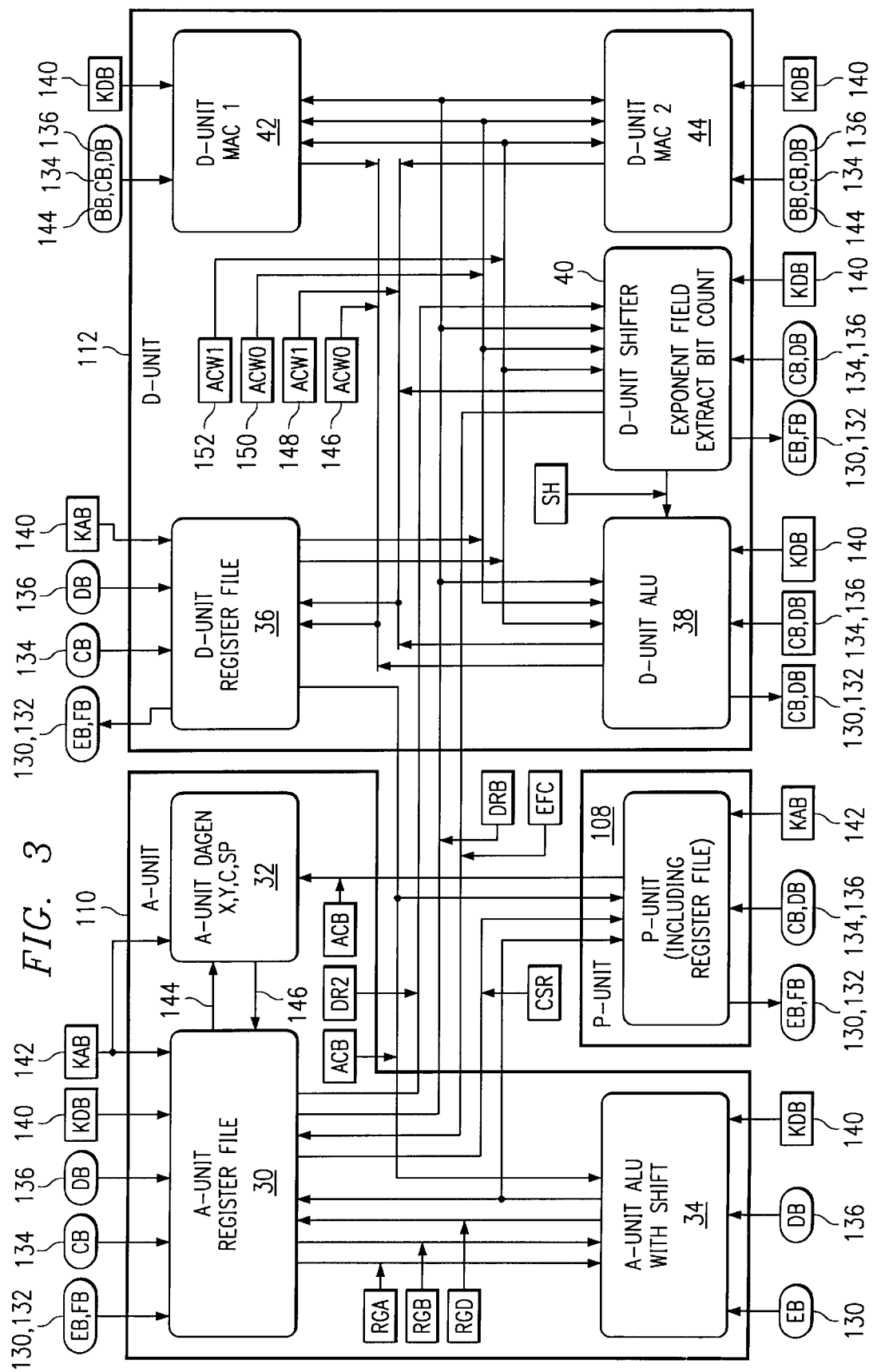
FIG. 3 is a more detailed schematic block diagram of various execution units of the core of the processor of FIG. 1.

FIG. 3 illustrates the P Unit 108, A Unit 110 and D Unit 112 of the processing core 102 in more detail and shows the bus structure connecting the various elements of the processing core 102. The P Unit 108 includes, for example, loop control circuitry, GoTo/Branch control circuitry and various registers for controlling and monitoring program flow such as repeat counter registers and interrupt mask, flag or vector registers. The P Unit 108 is coupled to general purpose Data Write busses (EB, FB) 130, 132, Data Read busses (CB, DB) 134, 136 and an address constant bus (KAB) 142. Additionally, the P Unit 108 is coupled to sub-units within the A Unit 110 and D Unit 112 via various busses labeled CSR, ACB and RGD.

As illustrated in FIG. 3, in the present embodiment the A Unit 110 includes a register file 30, a data address generation sub-unit (DAGEN) 32 and an Arithmetic and Logic Unit (ALU) 34. The A Unit register file 30 includes various registers, among which are 16 bit pointer registers (AR0–AR7) and data registers (DR0–DR3) which may also be used for data flow as well as address generation. Additionally, the register file includes 16 bit circular buffer registers and 7 bit data page registers. As well as the general purpose busses (EB, FB, CB, DB) 130, 132, 134, 136, a data constant bus 140 and address constant bus 142 are coupled to the A Unit register file 30. The A Unit register file 30 is coupled to the A Unit DAGEN unit 32 by unidirectional busses 144 and 146 respectively operating in opposite directions. The DAGEN unit 32 includes 16 bit X/Y registers and coefficient and stack pointer registers, for example for controlling and monitoring address generation within the processing engine 100.

The A Unit 110 also comprises the ALU 34 which includes a shifter function as well as the functions typically associated with an ALU such as addition, subtraction, and AND, OR and XOR logical operators. The ALU 34 is also coupled to the general-purpose busses (EB, DB) 130, 136 and an instruction constant data bus (KDB) 140. The A Unit ALU is coupled to the P Unit 108 by a PDA bus for receiving register content from the P Unit 108 register file. The ALU 34 is also coupled to the A Unit register file 30 by busses RGA and RGB for receiving address and data register contents and by a bus RGD for forwarding address and data registers in the register file 30.

As illustrated, the D Unit 112 includes a D Unit register file 36, a D Unit ALU 38, a D Unit shifter 40 and two multiply and accumulate units (MAC1, MAC2) 42 and 44. The D Unit register file 36, D Unit ALU 38 and D Unit shifter 40 are coupled to busses (EB, FB, CB, DB and KDB) 130, 132, 134, 136 and 140, and the MAC units 42 and 44 are coupled to the busses (CB, DB, KDB) 134, 136, 140 and data read bus (BB) 144. The D Unit register file 36 includes 40-bit accumulators (AC0–AC3) and a 16-bit transition register. The D Unit 112 can also utilize the 16 bit pointer and data registers in the A Unit 110 as source or destination registers in addition to the 40-bit accumulators. The D Unit register file 36 receives data from the D Unit ALU 38 and MACs 1&2 42, 44 over accumulator write busses (ACW0, ACW1) 146, 148, and from the D Unit shifter 40 over accumulator write bus (ACW1) 148. Data is read from the D Unit register file accumulators to the D Unit ALU 38, D Unit shifter 40 and MACs 1&2 42, 44 over accumulator read busses (ACR0, ACR1) 150, 152. The D Unit ALU 38 and D Unit shifter 40 are also coupled to sub-units of the A Unit 108 via various busses labeled EFC, DRB, DR2 and ACB.

Figure 4:
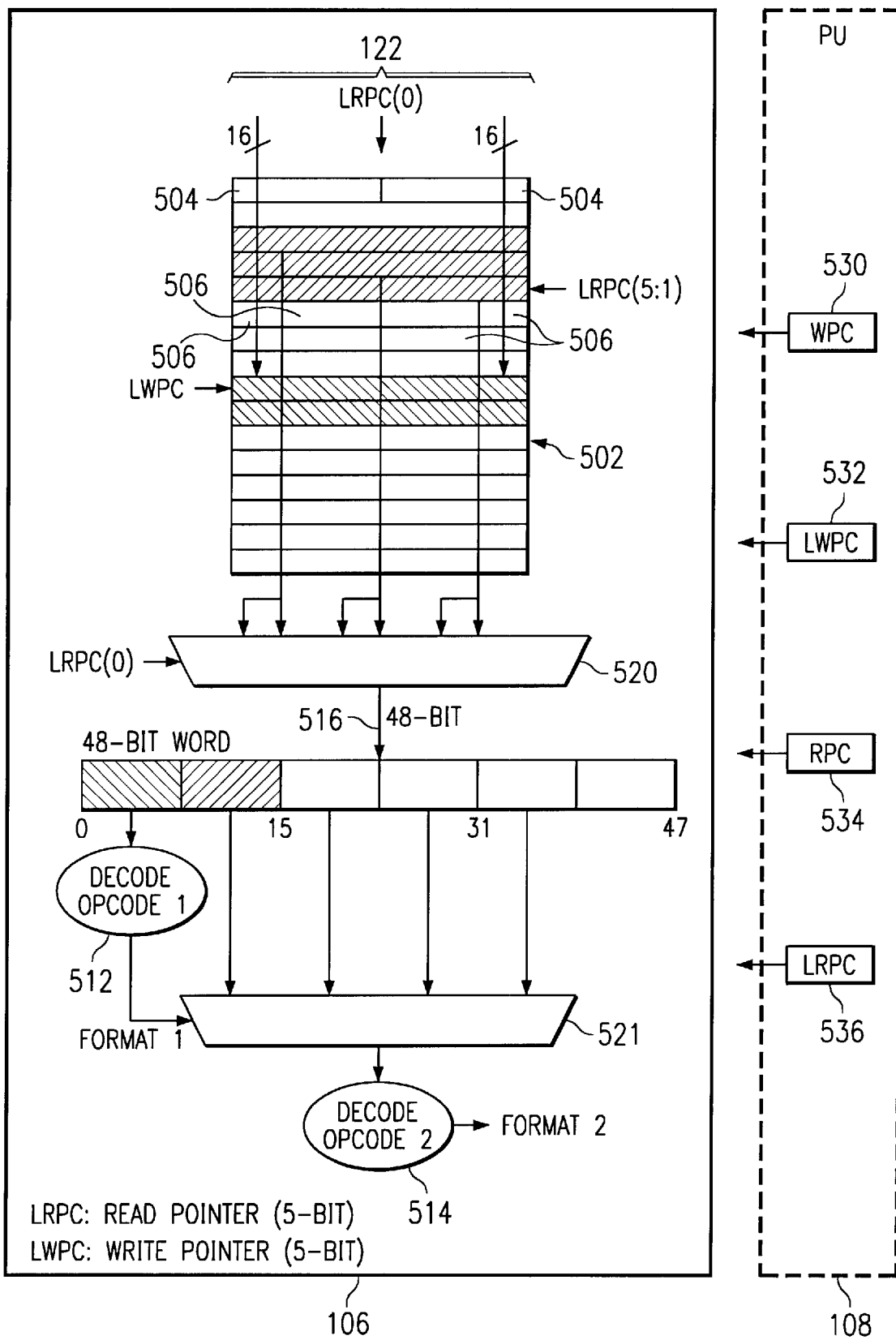
FIG. 4 is schematic diagram of an instruction buffer queue and an instruction decoder controller of the processor of FIG. 1.

Referring now to FIG. 4, there is illustrated an instruction buffer unit 106 comprising a 32 word instruction buffer queue (IBQ) 502. The IBQ 502 comprises 32×16 bit registers 504, logically divided into 8 bit bytes 506. Instructions arrive at the IBQ 502 via the 32-bit program bus (PB) 122. The instructions are fetched in a 32-bit cycle into the location pointed to by the Local Write Program Counter (LWPC) 532. The LWPC 532 is contained in a register located in the P Unit 108. The P Unit 108 also includes the Local Read Program Counter (LRPC) 536 register, and the Write Program Counter (WPC) 530 and Read Program Counter (RPC) 534 registers. LRPC 536 points to the location in the IBQ 502 of the next instruction or instructions to be loaded into the instruction decoder(s) 512 and 514. That is to say, the LRPC 534 points to the location in the IBQ 502 of the instruction currently being dispatched to the decoders 512, 514. The WPC points to the address in program memory of the start of the next 4 bytes of instruction code for the pipeline. For each fetch into the IBQ, the next 4 bytes from the program memory are fetched regardless of instruction boundaries. The RPC 534 points to the address in program memory of the instruction currently being dispatched to the decoder(s) 512 and 514.

The instructions are formed into a 48-bit word and are loaded into the instruction decoders 512, 514 over a 48-bit bus 516 via multiplexors 520 and 521. It will be apparent to a person of ordinary skill in the art that the instructions may be formed into words comprising other than 48-bits, and that the present invention is not limited to the specific embodiment described above.

The bus 516 can load a maximum of two instructions, one per decoder, during any one instruction cycle. The combination of instructions may be in any combination of formats, 8, 16, 24, 32, 40 and 48 bits, which will fit across the 48-bit bus. Decoder 1, 512, is loaded in preference to decoder 2, 514, if only one instruction can be loaded during a cycle. The respective instructions are then forwarded on to the respective function units in order to execute them and to access the data for which the instruction or operation is to be performed. Prior to being passed to the instruction decoders, the instructions are aligned on byte boundaries. The alignment is done based on the format derived for the previous instruction during decoding thereof. The multiplexing associated with the alignment of instructions with byte boundaries is performed in multiplexors 520 and 521.

Figure 5:
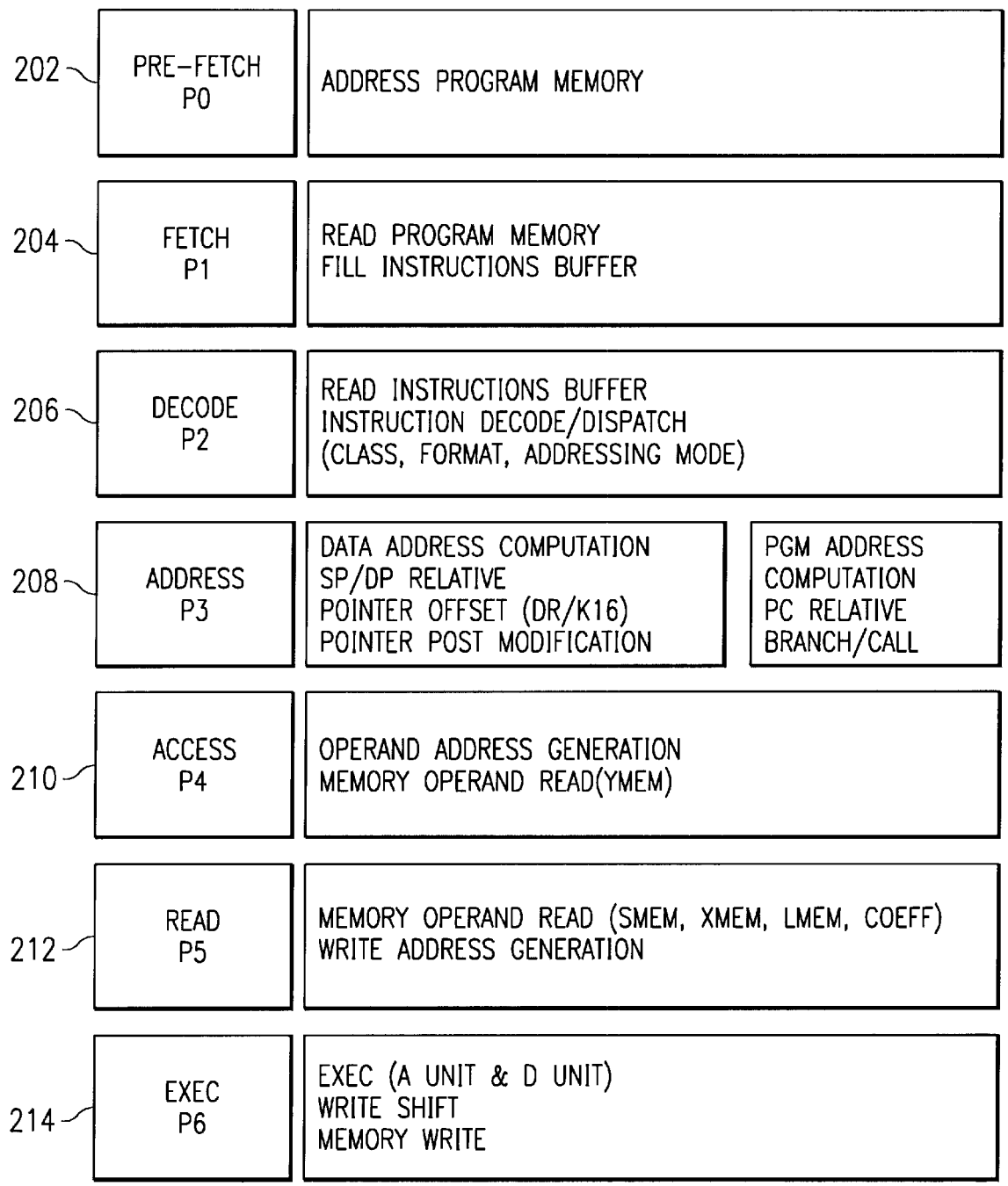
FIG. 5 is a representation of pipeline phases of the processor of FIG. 1.

The processor core 102 executes instructions through a 7 stage pipeline, the respective stages of which will now be described with reference to FIG. 5.

The first stage of the pipeline is a PRE-FETCH (P0) stage 202, during which stage a next program memory location is addressed by asserting an address on the address bus (PAB) 118 of a memory interface, or memory management unit 104.

In the next stage, FETCH (P1) stage 204, the program memory is read and the I Unit 106 is filled via the PB bus 122 from the memory management unit 104.

The PRE-FETCH and FETCH stages are separate from the rest of the pipeline stages in that the pipeline can be interrupted during the PRE-FETCH and FETCH stages to break the sequential program flow and point to other instructions in the program memory, for example for a Branch instruction.

The next instruction in the instruction buffer is then dispatched to the decoder/s 512/514 in the third stage, DECODE (P2) 206, where the instruction is decoded and dispatched to the execution unit for executing that instruction, for example to the P Unit 108, the A Unit 110 or the D Unit 112. The decode stage 206 includes decoding at least part of an instruction including a first part indicating the class of the instruction, a second part indicating the format of the instruction and a third part indicating an addressing mode for the instruction.

The next stage is an ADDRESS (P3) stage 208, in which the address of the data to be used in the instruction is computed, or a new program address is computed should the instruction require a program branch or jump. Respective computations take place in the A Unit 110 or the P Unit 108 respectively.

In an ACCESS (P4) stage 210 the address of a read operand is output and the memory operand, the address of which has been generated in a DAGEN X operator with an Xmem indirect addressing mode, is then READ from indirectly addressed X memory (Xmem).

The next stage of the pipeline is the READ (P5) stage 212 in which a memory operand, the address of which has been generated in a DAGEN Y operator with an Ymem indirect addressing mode or in a DAGEN C operator with coefficient address mode, is READ. The address of the memory location to which the result of the instruction is to be written is output.

In the case of dual access, read operands can also be generated in the Y path, and write operands in the X path.

Finally, there is an execution EXEC (P6) stage 214 in which the instruction is executed in either the A Unit 110 or the D Unit 112. The result is then stored in a data register or accumulator, or written to memory for Read/Modify/Write or store instructions. Additionally, shift operations are performed on data in accumulators during the EXEC stage.

Figure 6:
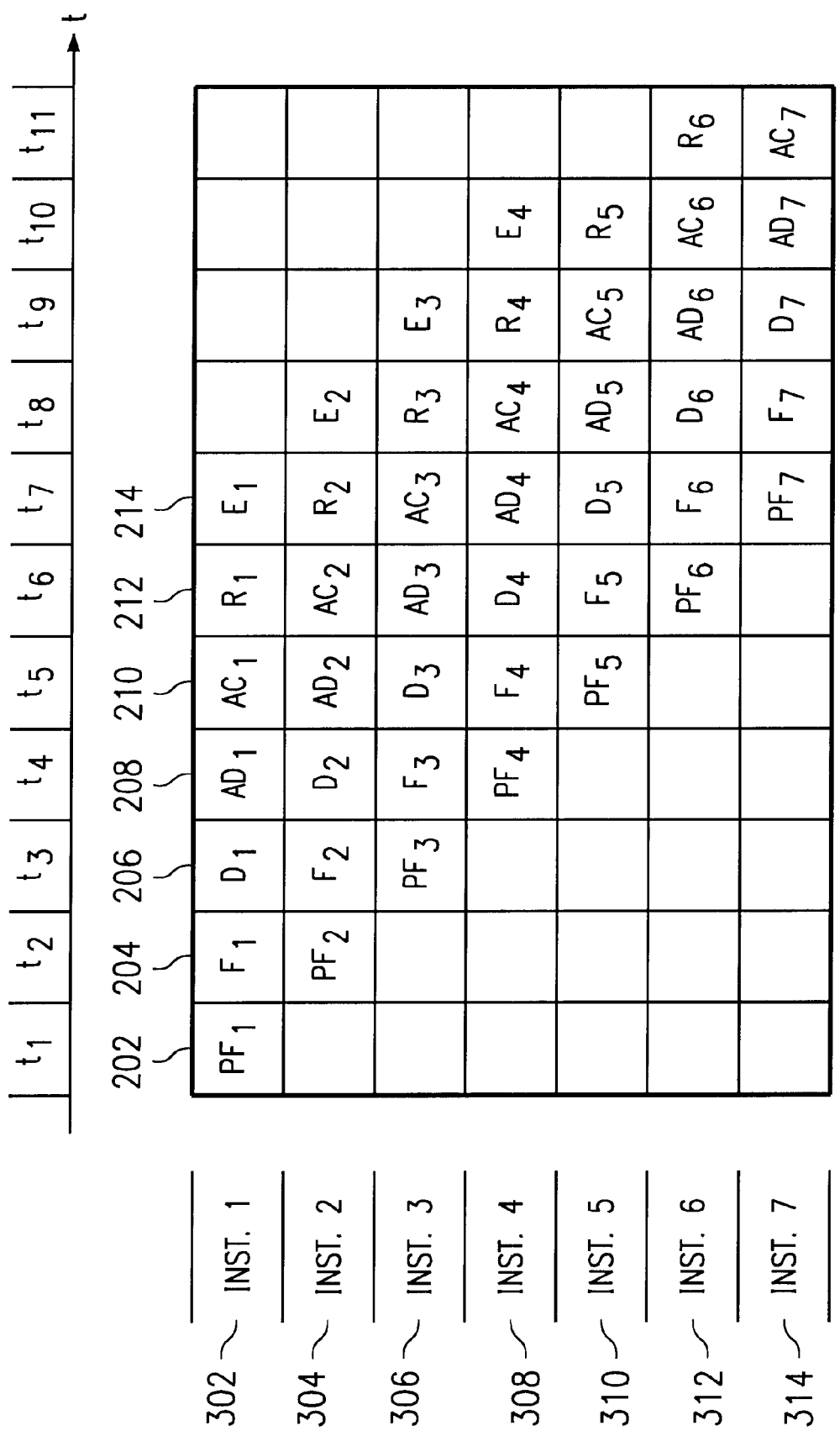
FIG. 6 is a diagrammatic illustration of an example of operation of a pipeline in the processor of FIG. 1.

The basic principle of operation for a pipeline processor will now be described with reference to FIG. 6. As can be seen from FIG. 6, for a first instruction 302, the successive pipeline stages take place over time periods $T_1$–$T_7$. Each time period is a clock cycle for the processor machine clock. A second instruction 304, can enter the pipeline in period $T_2$, since the previous instruction has now moved on to the next pipeline stage. For instruction 3, 306, the PRE-FETCH stage 202 occurs in time period $T_3$. As can be seen from FIG. 6 for a seven stage pipeline a total of 7 instructions may be processed simultaneously. FIG. 6 shows all 7 instructions 302–314 being processed in time period $T_7$. Such a structure adds a form of parallelism to the processing of instructions.

Figure 7:
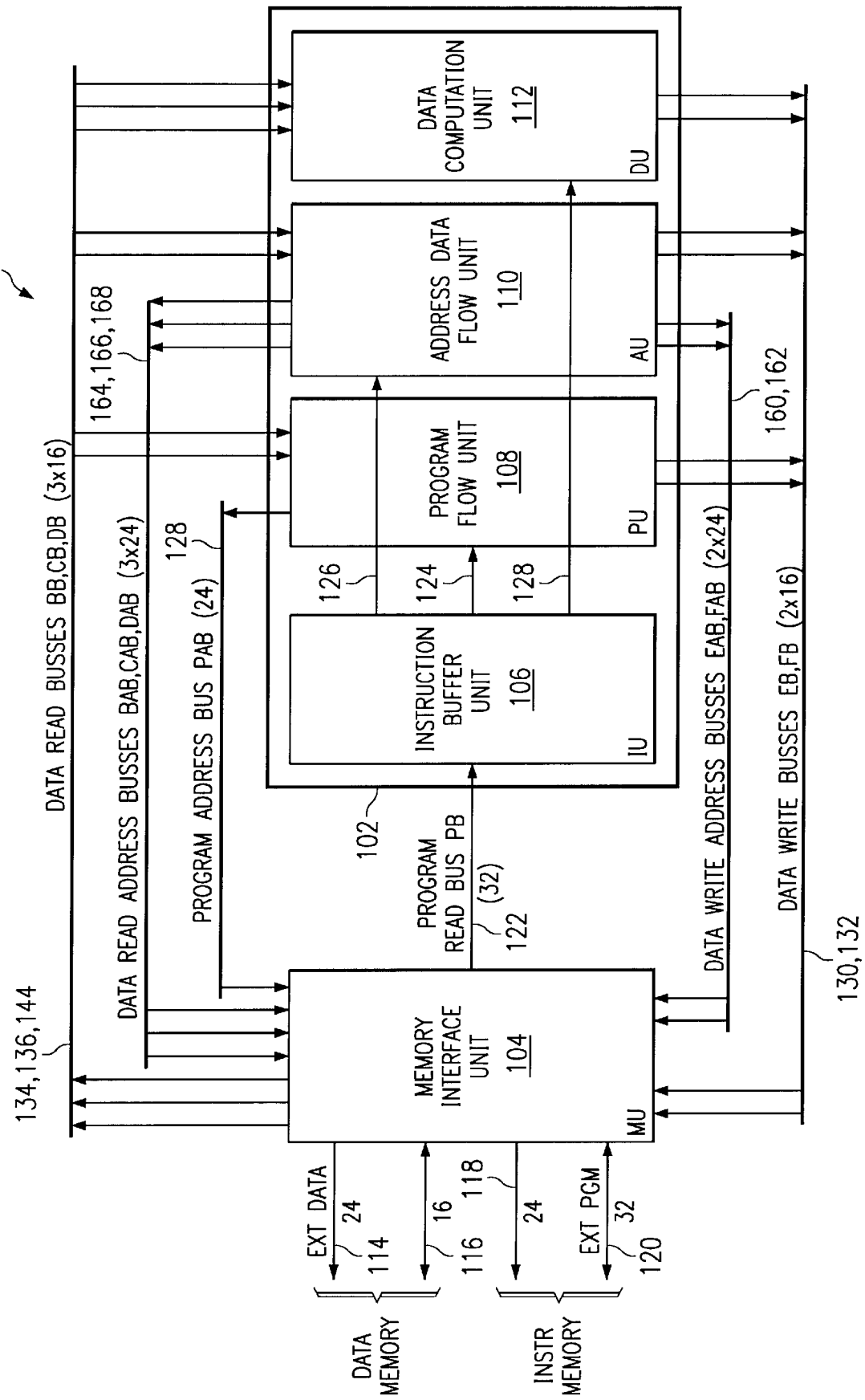
FIG. 7 is a schematic representation of the core of the processor for explaining the operation of the pipeline of the processor of FIG. 1.

As shown in FIG. 7, the present embodiment of the invention includes a memory management unit 104 which is coupled to external memory units (not shown) via a 24 bit address bus 114 and a bi-directional 16 bit data bus 116. Additionally, the memory management unit 104 is coupled to program storage memory (not shown) via a 24 bit address bus 118 and a 32 bit bidirectional data bus 120. The memory management unit 104 is also coupled to the I Unit 106 of the machine processor core 102 via a 32 bit program read bus (PB) 122. The P Unit 108, A Unit 110 and D Unit 112 are coupled to the memory management unit 104 via data read and data write busses and corresponding address busses. The P Unit 108 is further coupled to a program address bus 128.

More particularly, the P Unit 108 is coupled to the memory management unit 104 by a 24 bit program address bus 128, the two 16 bit data write busses (EB, FB) 130, 132, and the two 16 bit data read busses (CB, DB) 134, 136. The A Unit 110 is coupled to the memory management unit 104 via two 24 bit data write address busses (EAB, FAB) 160, 162, the two 16 bit data write busses (EB, FB) 130, 132, the three data read address busses (BAB, CAB, DAB) 164, 166, 168 and the two 16 bit data read busses (CB, DB) 134, 136. The D Unit 112 is coupled to the memory management unit 104 via the two data write busses (EB, FB) 130, 132 and three data read busses (BB, CB, DB) 144, 134, 136.

FIG. 7 represents the passing of instructions from the I Unit 106 to the P Unit 108 at 124,. for forwarding branch instructions for example. Additionally, FIG. 7 represents the passing of data from the I Unit 106 to the A Unit 110 and the D Unit 112 at 126 and 128 respectively.

The pipelined architecture described above enables high instruction throughputs due to the various stages being operable in parallel. However, the throughput of instructions can be interrupted in the case of a conditional branch pending determination of the branch condition. It is desirable, therefore, to provide for the resolution of the condition as soon as possible. A typical condition is a test on zero, as described in the introduction. There are also other computations in a processor where it is desirable to know that a zero result is expected. An embodiment of the invention provides a zero anticipation mechanism which can enable anticipation of a zero condition for an arithmetic computation before completion of the arithmetic computation.

In the following, a systematic and generic approach to generating a zero detection mechanism is described based on a Carry Look-Ahead (CLA) adder-like structure.

Although the technique of the present invention lends itself to use with many different types of digital processing circuitry, the discussion herein will be with respect to an implementation using a CLA adder-like structure. However, those skilled in the art after review of this description will recognize that the techniques of the present invention may be used with other types of digital processor circuitry.

A zero detection mechanism according to the invention finds application to many types of processing units, including, but not only processing units of the processor described with reference to the preceding Figures. Examples of such units are arithmetic units such as Multiply and ACcumulator (MAC) units, floating and fixed point units, Arithmetic and Logic Units (ALUs), in general. As will become clear in the following, an embodiment of the invention based on a CLA-like structure takes advantage of intermediate calculation within the adder structure to perform fast zero detection.

Before describing an implementation of the zero detection mechanism, there follows a description of the following mathematical algorithms on which the CLA architecture of the embodiment is based:

Where a and b are two operands of an addition, then:

$$g(i) = a(i) \cdot b(i) \quad (1)$$

$$g(i) = a(i) \oplus b(i) \quad (2)$$

In equations (1) and (2) above, "g" is a "generate term and "p" is a "propagate term. The symbol "·" represents a logical AND operation and the symbol "⊕" represents a logical Exclusive OR (XOR) operation. The "g" and "p" terms are combined to compute a carry. Indeed, $c(i)=G(i)=G(i,0)$, if the carry in=0, where:

$$(G(i,0), P(i,0))=(g(0), p(0)), \text{ if } i=0$$

$$(G(i,0), P(i,0))=(g(i)p(i))o(G(i-1,0), P(i-1,0)) \text{ otherwise,} \quad (3)$$

and where the operator o is:

$$(g\_1, p\_1)o(g\_r, p\_r)=(g\_{1+}(p\_1 \cdot g\_r), p\_1 \cdot p\_r) \quad (4)$$

In the above equation, the symbol "+" represents a logic OR operation.

It can be proven that the commutativity of the "o" operator leads to:

$$(G(n,m), P(n,m))=(G(n,k+1)), P(n,k+1))o(G(k,m), P(k,m)) \ (n>k \geq m)$$

and $$(G(n,m), P(n,m))=(G(n-m,0), P(n-m,0)) \ (n \geq m) \quad (5)$$

The same architecture can be used for several slices of operands, with the result of these calculations being combined to provide global carry generation, based on the 'o' operator. A slice of an operand comprises a range of bits of the operand. The degree of freedom provided by the index k in the above equation is used to slice the operand in the most efficient way, in terms of propagation delay. This is done by minimizing the global propagation time through the fast carry generator.

In order to illustrate zero detection, consider a simple example of two bit addition:

a: 00 01 10 b: 00 11 10 p: 00 10 00 g: 00 01 10

It should be noted that the terms a and b may be exchanged. In order to generalize this to n-bit addition, a new zero term (equation 8 below) is defined and can be combined with equations (1) and (2) above to form a set of three equations (6), (7) and (8) for defining a p(i) bit, a g(i) bit and zero(i) bit, respectively:

$$g(i)=a(i) \cdot b(i) \quad (6)$$

$$p(i)=a(i) \oplus b(i) \quad (7)$$

$$zero(i)=\sim(a(i)+b(i)) \quad (8)$$

The representation "$\sim(a(i)+b(i))$" indicates the complement of "$(a(i)+b(i))$"

Figure 8:
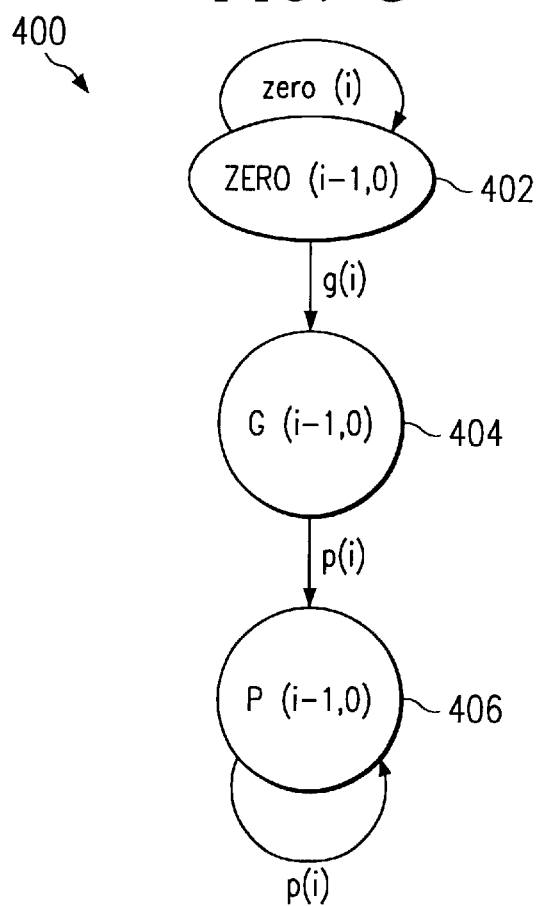
FIG. 8 is state diagram of a zero detection mechanism.

A combination of the definitions of the three bits as defined in equations as set out at (6), (7) and (8) above leads to a state machine definition 400 of a zero anticipation mechanism as illustrated in FIG. 8, in which the states of the system are:

ZERO(i,0)=State zero (402)

G(i,0)=State generate (404)

P(i,0)=State propagate (406)

Equations for defining the states ZERO(i,0), G(i,0) and P(i,0) are:

$$ZERO(i,0)=zero(i) \ ZERO(i-1,0) \quad (9)$$

$$G(i,0)=g(i) \ ZERO(i-1,0) \quad (10)$$

$$P(i,0)=p(i) \ (G(i-1,0)+P(i-1,0)). \quad (11)$$

Thus, a zero (Z) is detected on bit i, if one of these three states is found.

$$Z(i,0)=ZERO \ (i,0)+G(i,0)+P(i,0) \quad (12)$$

In other words, this means that the addition of two operands results in a zero if a state is produced such that an index k ($0 \leq k \leq n$) is found so that:

$$p(n-1) \ldots p(k-1)g(k) \ zero(0) \ \text{if} \ (0 \geq k \geq n) \quad (13)$$

To provide zero detection using the fast carry generation architecture described above, an operator is defined with the same properties as the operator "o". This can be derived from the equation (13) above. Indeed, two operand slices (n,k+1) and (k,m) each result in a zero if they have the property described in equation (13) above. A zero will be detected on a slice (n, m) in the two following cases:

the state of the (k,m) slice is all zeros (A)

the state of (n,k+1) is a zero_detect (i.e. the same as one of the states at (12)) (B)

or the state of (k,m) is a zero_detect and the slice contains a "g" (C)

the state of (n,k+1) is all p's (D)

This leads to the following equation:

$$Z(n,) = \underbrace{(Z(k, m) \text{ and }}_{(A)} \underbrace{\sim G(k, m) \text{ and } Z(n, k + 1))}_{(B)} \text{ or} \quad (14)$$

$$\underbrace{(Z(k, m) \text{ and } G(k, m)}_{(C)} \text{ and } \underbrace{P(n, k + 1)}_{(D)}$$

where $Z(i,i)=g(i)+zero(i)$.

Also, the G(ij) and P(ij) terms can be taken from the adder fast-carry generation intermediate results. Thus, the zero-detection mechanism achieved by modifying the "o" operator in the following way to form a "u" operator which is defined as $$(g\_1, p\_1, z\_1)u(g\_r, p\_r, z\_r)=$$

$$(g\_1+(p\_1 \cdot g\_r), p\_1 \cdot p\_r,(z\_1 \cdot z\_r \cdot (\sim g\_r))+p\_1 \cdot z\_r \cdot g\_r)$$

Using these equations, cells can be created that are optimized both for layout implementation and performance. These cells are optimized for CMOS technology which invert signals.

Figure 9A:
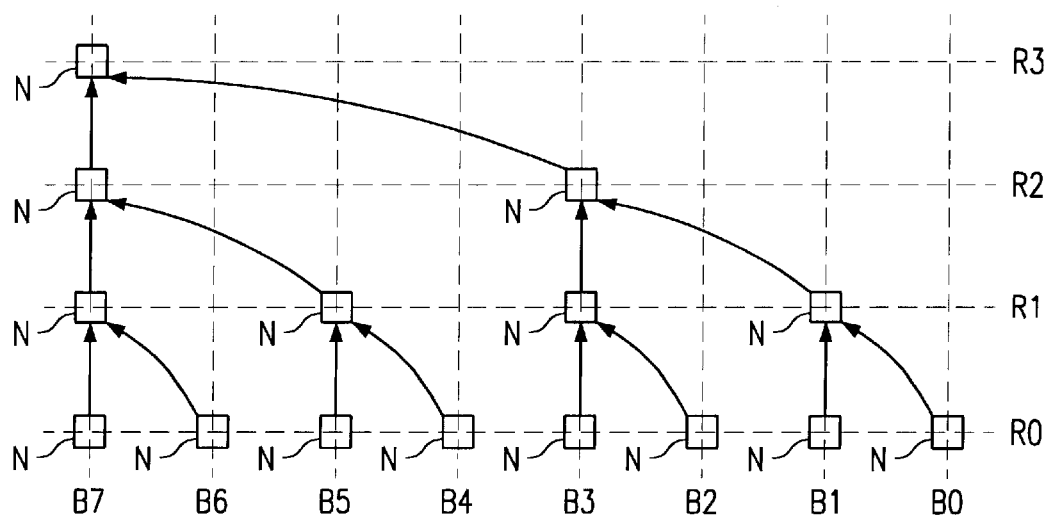

FIG. 9A is a schematic representation of an approach to implementing a zero anticipation mechanism in the form of time optimal adder comprising a binary tree of nodes N based on the principles set down in the above equations. The arrows joining the nodes represent the propagation of intermediate zero signals. FIG. 9A illustrates this structure for 8 bit positions B0–B7. However, it will be apparent from FIG. 9A how this can be extended to any number of bit positions.

FIG. 9B is a specific exemplary implementation for such a time optimal adder for 5 bits (e.g. bits B0–B4 of FIG. 9A). This includes an array of cells C(ij), with cells CC, implementing the operator "u" for combining intermediate anticipation signal, and cells CB for forwarding intermediate anticipation signals between the cells CC. In parentheses are slice boundaries (ij). A slice boundary is the boundary between slices. Each column in FIG. 9B represents a bit position with the bit positions increasing from a lowest significant bit position on the right to successively higher bit positions towards the left.

As illustrated in FIG. 9B, the array for a 5-bit operation is sliced into a first sub-array 408 for a 2-bit operation and a second sub-array 410 for a 3-bit operation, and that the global result is obtained by combining the two intermediate results via the "u" operator (e.g. (4,4) u (3,2)=(4,2)).

Inputs for bits B0–B4 are supplied to cells of the first row 412. The intermediate anticipation signals ripple upwards through the second row 413 and the third row 414 and towards the left as indicated by the arrows. The signals pass from one row to the next with a delay corresponding to the time taken for the combining of the intermediate results, but pass horizontally without delay. The intermediate anticipation result from the first 2-bit operation 408 is generated at the cell 415 and is supplied to the third row 414 of cells of the three bit operation to form the global result at a vertical output from the cell 416.

The principles employed correspond to those employed in the binary tree of FIG. 9A. The first row 412 in FIG. 9B corresponds to row R1 in FIG. 9A. The cells CC of FIG. 9B effectively correspond to the nodes N of FIG. 9A. It will be noted that the distribution of the cells CC in the columns for bits B2, B3 and B4 and the rows 413 and 414 of FIG. 9B differs from that of the nodes N in the columns for bits B2, B3 and B4 and the rows R2 and R3 of FIG. 9A. This is due to the slicing of the 5-bit adder array of FIG. 9B into the 2 bit and 3 bit sub-arrays 408 and 410. Although an implementation of a 5-bit adder is depicted in FIG. 9B, using the principles set out above and the illustrations in FIGS. 9A and 9B, it will be apparent how this can be extended to provide a time optimal adder for a zero anticipation mechanism for any desired number of bits.

It can be shown that the carry_in does not affect the carry generation architecture described above, and can be taken into account at the very end of the calculation. This can be demonstrated by recurrence in the CLA adder:

1) the carry_out from the first 1-bit slice is:

$$c(0)=G(0,0)+P(0,0)\cdot carry\_in.$$

2) Assuming that i exists, such that $c(i)=G(i,0)+P(i,0)\cdot carry\_in$.

$$\begin{aligned}c(i+1) &= g(i+1) + p(i+1)\cdot c(i)\\ &= g(i+1) + p(i+1)\cdot(G(i,0)+P(i,0)\cdot carry\_in)\\ &= g(i+1) + p(i+1)\cdot G(i,0) + p(i+1)\cdot P(i,0)\cdot carry\_in\\ &= (g(i+1) + p(i+1)\cdot G(i,0)) + (p(i+1)\cdot P(i,0))\cdot carry\_in\\ &= G(i+1,0) + P(i+1,0)\cdot carry\_in\end{aligned}$$

Thus, the impact of the carry in on the final result can be computed after the fast_carry generation scheme. This property is also true for zero detection. Indeed if carry_in=0, then a zero is detected if the property in equation (13) is verified, and if carry_in=1, a zero is detected if the n-bit state is all p's.

This results in the equation:

$$zero\_detect = \sim carry\_in \cdot Z(n-1,0) + carry\_in \cdot P(n-1,0).$$

The final result of the zero detection can be supplied to enable anticipation of a zero result and to provide early indication of the result of, for example, condition codes evaluation.

FIG. 10 illustrates the inputs and outputs for one of the cells CC(ij) 420 which are shown as a closed box in the FIG. 9B. This type of cell implements the "u" operation, and, in the general case, has the following inputs and outputs, both vertically and horizontally:

Vertical input (422): p_r, g_r, z_r

Horizontal input (424): p_1, g_1, z_1

Horizontal output (426): p_1, g_1, z_1

Vertical output (428): P, G, Z=(p_r, g_r, z_r) u (p_1, g_1, z_1)

It can be seen that a horizontal input 424 (if present) is simply passed to the horizontal output 426. This is performed without modification and without delay, so that the output signal is available substantially at the time the input signal is available. It can also be seen that the vertical output 428 is a combination, as defined by the operator "u" of the vertical input 422 and the horizontal input 424. This process does take a certain time, so that the vertical output 428 is available shortly after the vertical and horizontal inputs 422, 424 are available. The individual cells need not have a full set of inputs and outputs depending upon its position in the array, as shown in FIGS. 9A and 9B.

FIG. 11 illustrates the inputs and outputs for one of the cells CB(ij) 430 which are shown as an open box in FIG. 9B. This type of cell simply forwards signals from inputs to outputs of the cells, as illustrated below:

Vertical input (432): p_r, g_r, z_r

Horizontal output (436): p_1, g_1, z_1=p_r, g_r, z_r

Vertical output(438): p_r, g_r, z_r

The horizontal output signals (p_1, g_1, z_1) at 436 are copies of the vertical input signals (p_r, g_r, z_r) from 432, which have been "amplified" by a buffer. The vertical output signals (p_r, g_r, z_r) at 438 are the vertical input signals (p_r, $g_{13}$ r, z_r) from 432, which have been "amplified" by a buffer. A vertical input 432, if present, is passed to the horizontal and vertical outputs, 436 and 438 although the output is delayed with respect to the input by an amount corresponding to the delay involved in generating a combination signal in one of the combining cells CC 420. It will be noted that the individual cells CB 430 have vertical inputs and horizontal and/or vertical outputs depending upon the position in the array, as shown in FIG. 9B.

The delay in the vertical direction provided by the buffer cells is needed in order that propagation of the signals in the upward direction in FIG. 9B runs in parallel in each column. The horizontal propagation is effectively immediate, so that a result is available at the vertical output (where provided) of the last cell in the vertical direction (i.e. the topmost cell as shown in FIG. 9B) for each bit position.

As described above, the example shown in FIG. 9B is effectively split into two sub-arrays, with intermediate anticipation signals propagating to the left and upwardly via the various cells in each sub-array, with the output of the first sub-array being combined with the output of the second cell in the third row (i.e. the topmost row of cells).

The intermediate anticipation signals of the operation of the five bit example of FIG. 9B operation are shown in Table 1, where Rows A and B represent two 5-bit input values.

TABLE 1

| A | 1 | 1 | 0 | 0 | 1 |
|---|---|---|---|---|---|
| B | 0 | 0 | 1 | 1 | 1 |
| p_in | 1 | 1 | 1 | 1 | 0 |
| g_in | 0 | 0 | 0 | 0 | 1 |

TABLE 1-continued

| z_in | 0 | 0 | 0 | 0 | 1 |
|---|---|---|---|---|---|
| stage 1 | P (4, 4) = 1 | P (3, 2) = 1 | P (2, 2) = 1 | P (1, 0) = 0 | P (0, 0) = 0 |
|  | G (4, 4) = 0 | G (3, 2) = 0 | G (2, 2) = 0 | G (1, 0) = 1 | G (0, 0) = 1 |
|  | Z (4, 4) = 0 | Z (3, 2) = 0 | Z (2, 2) = 0 | Z (1, 0) = 1 | Z (0, 0) = 1 |
| stage 2 | P (4, 2) = 1 | P (3, 2) = 1 | P (2, 2) = 1 | P (1, 0) = 0 | P (0, 0) = 0 |
|  | G (4, 2) = 0 | G (3, 2) = 0 | G (2, 2) = 0 | G (1, 0) = 1 | G (0, 0) = 1 |
|  | Z (4, 2) = 0 | Z (3, 2) = 0 | Z (2, 2) = 0 | Z (1, 0) = 1 | Z (0, 0) = 1 |
| stage 3 | P (4, 0) = 0 | P (3, 0) = 0 | P (2, 0) = 0 | P (1, 0) = 0 | P (0, 0) = 0 |
|  | G (4, 0) = 1 | G (3, 0) = 1 | G (2, 0) = 1 | G (1, 0) = 1 | G (0, 0) = 1 |
|  | Z (4, 0) = 1 | Z (3, 0) = 1 | Z (2, 0) = 1 | Z (1, 0) = 1 | Z (0, 0) = 1 |
| sum | 0 | 0 | 0 | 0 | 0 |
| zero | 1 | 1 | 1 | 1 | 1 |

As, in many applications, the intermediate zero anticipation detection results, which are available for the various bit positions in the top row of cells, are not needed. In such cases, the top left cell alone (in FIG. 9B, cell CC(4,0)) can be kept as an "u" operator, with one or more of the remaining cells in that row (where the intermediate results are not needed) being replaced by "o" operators if the zero detection is in CLA adder, so as to avoid unnecessary logic and improve overall performance. However, "u" operator cells can also be provided at specific bit positions where intermediate zero anticipation results are needed for intermediate bit positions in an embodiment.

Figure 12:
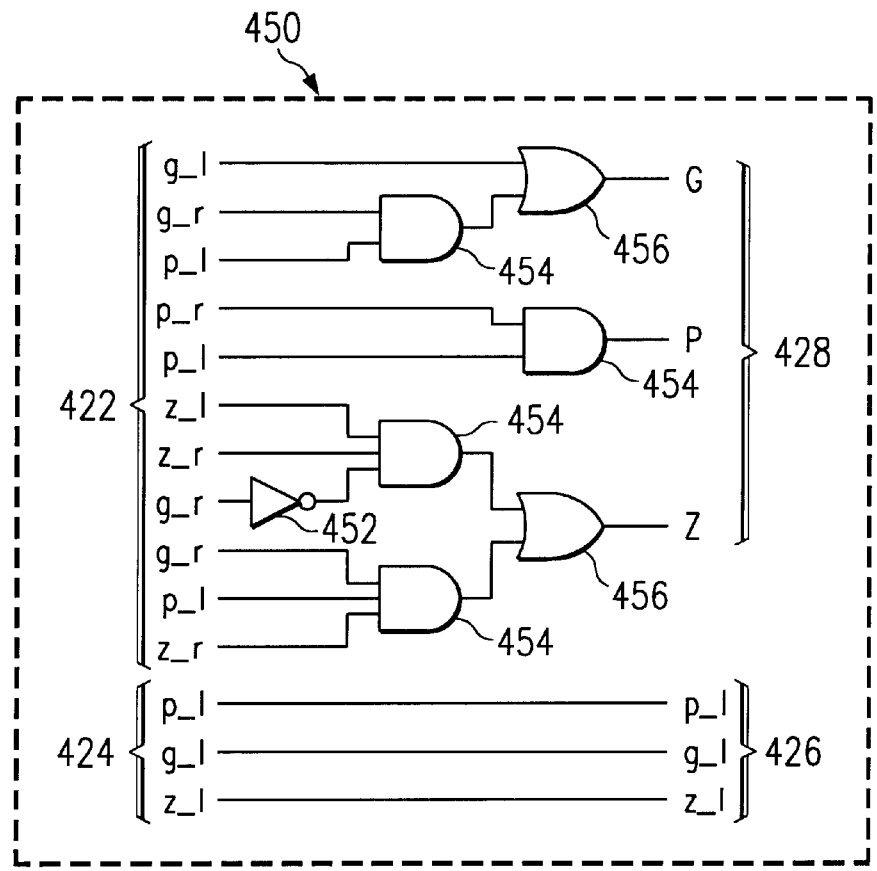
FIG. 12 is an example of logic for implementing the first type of cell of FIG. 10.

FIG. 12, is a schematic block diagram of an example of circuitry 450 including logic gates for implementing the "u" operator in one of the "CC" cells 420 of FIG. 10. In this diagram, the inputs 422 and 424 shown in FIG. 10 are provided at the left side of the Figure, and the outputs 426 and 428 are shown at the right hand side. As can be seen in FIG. 12, the circuitry for the operator includes one NOT gate 452, four AND gates 454 and 20 two OR gates 456. It can be seen that the gates implement the operator "u". It will, however, be appreciated that other gate structures could be used to implement the operator "u" in other embodiments.

Figure 13:
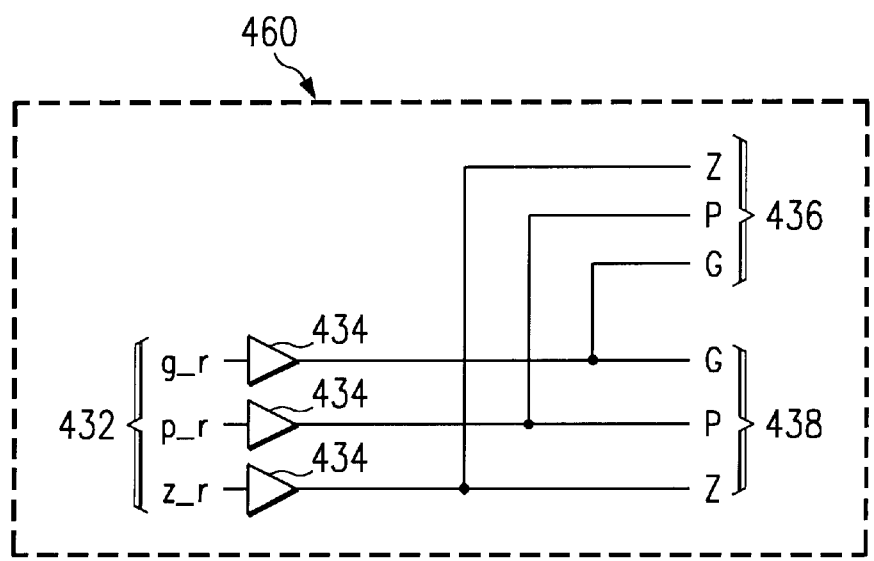
FIG. 13 is an example of logic for implementing the second type of cell of FIG. 11.

FIG. 13 is a schematic block diagram of an example of circuitry 460 for implementing one of the buffer cells CB of FIG. 11. In this diagram, the vertical inputs 432 shown in FIG. 11 are provided at the left hand side of the Figure and the horizontal and vertical outputs 436 and 438 are shown at the right hand side. As can be seen in FIG. 13, the circuitry includes three buffer (delay) circuits 434, one for each of the g_r, p_r and z_r inputs 432. The delay factor of the buffer circuits is selected to match the delay imposed by the circuitry for performing the "u" operation. The outputs from the buffer circuits 434 are supplied to the horizontal and/or vertical outputs 436 and 438, depending on the position of the buffer cell CB in the array illustrated in FIG. 9B.

Figure 14:
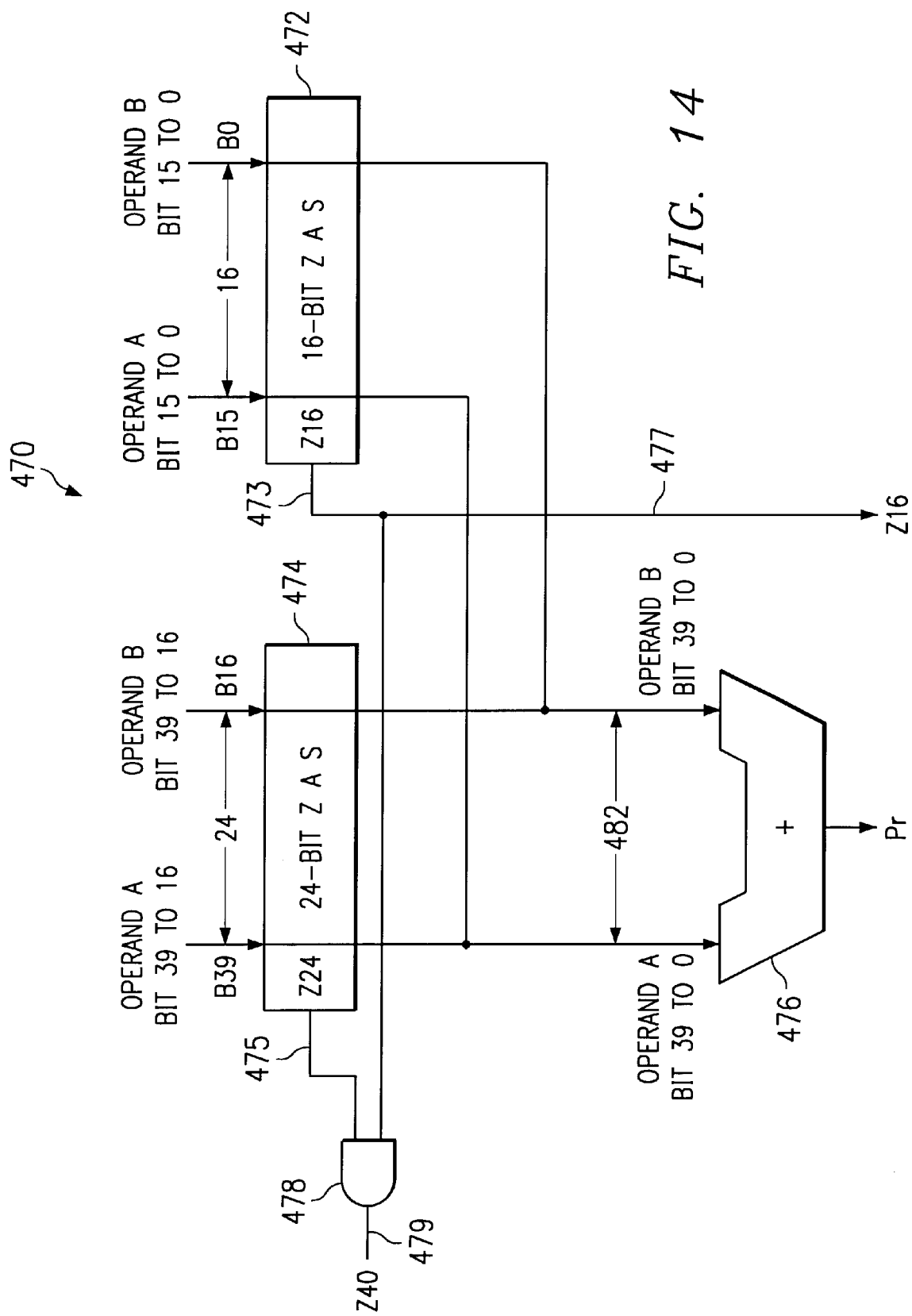
FIG. 14 is a schematic block diagram representing another example of a zero detection mechanism according to the invention.

FIG. 14 is a schematic block diagram of an example application of the zero look-ahead mechanism of FIGS. 9A/9B to a forty-bit final adder stage 470 of a multiply and accumulate unit, such as the MACs 1 and 2 (42,44) shown in FIG. 3. In this example, zero anticipation is required at forty bits and also at sixteen bits. In FIG. 14, a first zero anticipation stage 472, provides a zero anticipation output based on 16 bits B0–B15 supplied to it. These sixteen bits B0–B15 for which signals are supplied correspond to the sixteen lowest order bits of the arithmetic unit result. The arithmetic result bits are also supplied to the saturation stage 476 of the MAC. The zero anticipation result signal 473 on 16 bits is output at 477. It is also supplied to a logical AND gate 478 where the signal is added to a partial zero anticipation result signal 475 from a second zero anticipation stage 474. The second zero anticipation stage 474, provides a zero anticipation output based on signals for 24 bits supplied to it. The twenty four bits for which signals are supplied correspond to the twenty four highest order bits B16–B39 of the forty bit arithmetic unit result. The arithmetic result bits B16–B39 are also supplied to the saturation stage 476 of the MAC.

By combining the 16 bit zero anticipation result signal with the 24 bit zero anticipation result signal in the AND gate 478, a global zero anticipation result signal 479 on 40 bits can be generated at the output of the AND gate 478.

Figure 15:
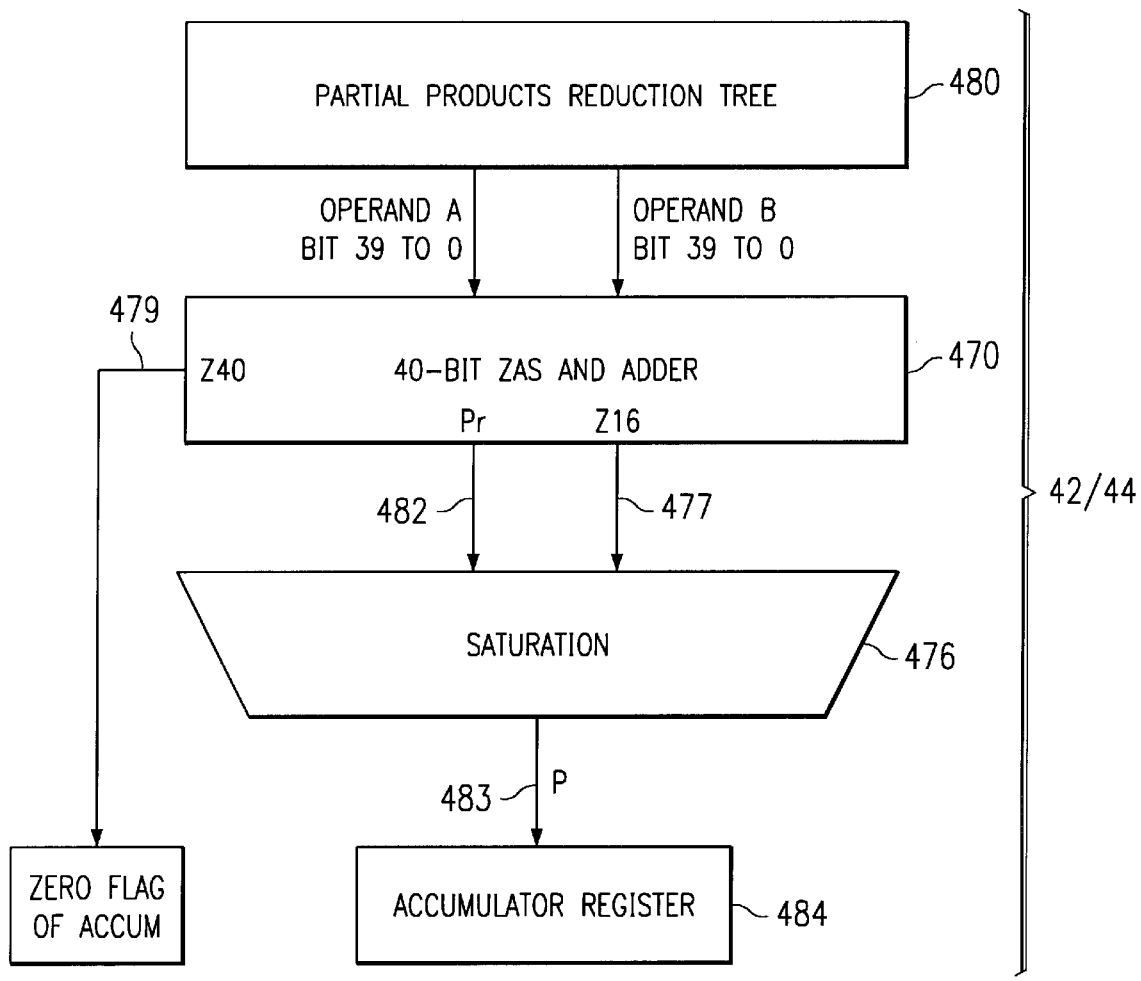
FIG. 15 is a schematic block diagram illustrating the incorporation of the zero detection mechanism in an arithmetic unit of the processor of FIG. 1.

FIG. 15 illustrates in more detail the connection of the zero anticipation mechanism of FIG. 14 in a MAC (e.g. the MAC 42 or the MAC 44 of FIG. 3). The outputs from a partial product reduction tree 480 of the MAC is supplied to the forty bit final adder and zero anticipation mechanism 470. The outputs of the final adder and zero anticipation mechanism comprise the global zero anticipation flag 479 for the final result on forty bits, the result of the final adder 482 and the 16th bit zero anticipation flag 477. The results from the final adder 482 and the 16th bit zero anticipation flag 477 are supplied to the saturation stage 476 of the MAC, from which the output 483 is supplied to an accumulator register.

Figure 16:
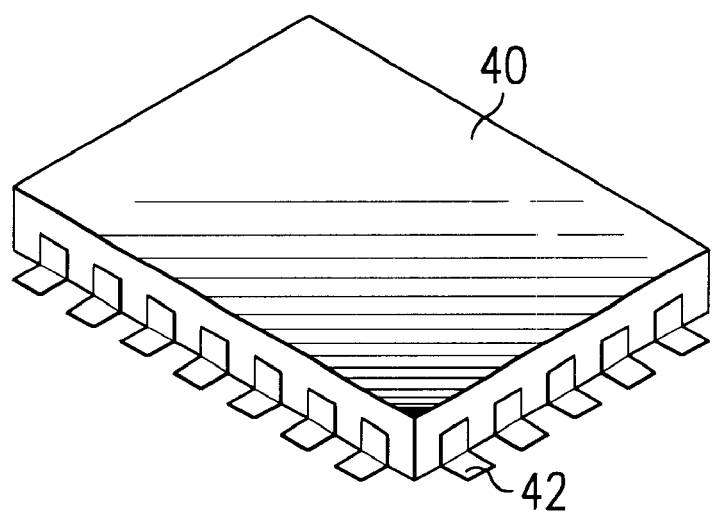
FIG. 16 is a schematic representation of an integrated circuit incorporating the processor of FIG. 1.

FIG. 16 is a schematic representation of an integrated circuit 40 incorporating the processor 10 of FIG. 1. The integrated circuit can be implemented using application specific integrated circuit (ASIC) technology. As shown, the integrated circuit includes a plurality of contacts 42 for surface mounting. However, the integrated circuit could include other configurations, for example a plurality of pins on a lower surface of the circuit for mounting in a zero insertion force socket, or indeed any other suitable configuration.

Figure 17:
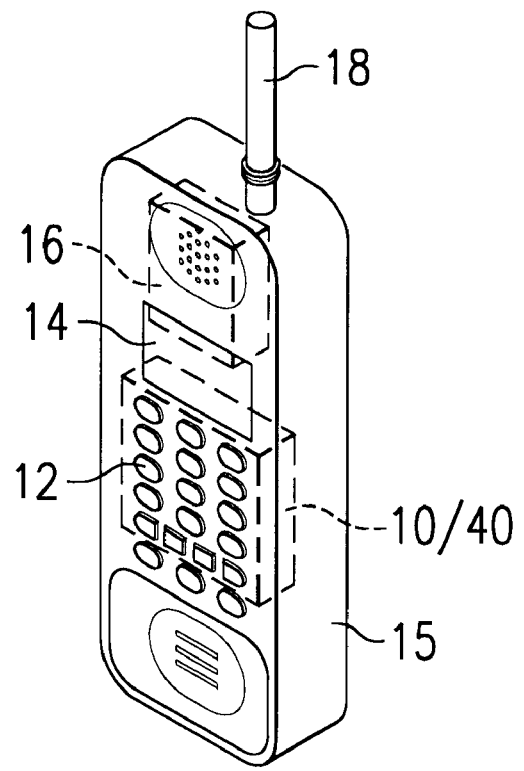
FIG. 17 is a schematic representation of a telecommunications device incorporating the processor of FIG. 1.

One application for a processing engine such as the processor 10, for example as incorporated in an integrated circuit as in FIG. 16, is in a telecommunications device, for example a mobile wireless telecommunications device. FIG. 17 illustrates one example of such a telecommunications device. In the specific example illustrated in FIG. 17, the telecommunications device is a mobile telephone 11 with integrated user input device such as a keypad, or keyboard 12 and a display 14. The display could be implemented using appropriate technology, as, for example, a liquid crystal display or a TFT display. The processor 10 is connected to the keypad 12, where appropriate via a keyboard adapter (not shown), to the display 14, where appropriate via a display adapter (not shown), and to a telecommunications interface or transceiver 16, for example a wireless telecommunications interface including radio frequency (RF) circuitry. The radio frequency circuitry could be incorporated into, or separate from, an integrated circuit 40 comprising the processor 10. The RF circuitry 16 is connected to an aerial 18.

Accordingly, there has been described an efficient way to implement on-the-fly zero detection of the result of an addition, which can be directly mapped onto a speed-optimized carry look-ahead fast-carry generating architecture. Carry_in is supported at virtually no area or speed expense.

As used herein, the terms "applied," "connected," and "connection" mean electrically connected, including where additional elements may be in the electrical connection path.

17

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A digital system with a processing engine, the processing engine comprising an arithmetic unit connected to a zero anticipation mechanism, the zero anticipation mechanism having an array of cells interconnected to produce an ordered sequence of intermediate anticipation signals comprising:

first cells connected to receive intermediate result signals from the arithmetic unit, each first cell having at least one output for providing an intermediate anticipation signal; and second cells for generating a combination of a first intermediate anticipation signal and a second intermediate anticipation signal supplied thereto, each second cell having inputs connected respectively to receive the first intermediate anticipation signal and the second intermediate anticipation signal from adjacent first cells or second cells, each second cell having at least one output for providing an intermediate anticipation signal; and wherein a selected one of the array of cells has an output for providing a zero anticipation signal.

2. The zero mechanism according to claim 1, further comprising third cells for forwarding an intermediate anticipation signal supplied thereto.

3. The zero mechanism according to claim 2 forming a binary tree of cells.

4. The zero mechanism according to claim 1, wherein the array of cells is an array with the cells selectively interconnected in first and second directions, the first cells and second cells each having at least one of the following:

a first input for connection to the output of an adjacent cell in the first direction;

a first output for connection to an input of an adjacent cell in the first direction;

a second input for connection to the output of an adjacent cell in the second direction; and a second output for connection to an input of an adjacent cell in the second direction.

5. The zero mechanism according to claim 4, wherein a cell having an input and a first output is operable to transmit a signal received at the input to the first output without delay.

6. The zero mechanism according to claim 5, wherein a cell for forwarding an intermediate anticipation signal and having an input and a second output is operable to buffer a signal received at the input for a predetermined time prior to forwarding the signal from the second output.

7. The zero mechanism according to claim 6, wherein a cell for combining intermediate anticipation signals supplied thereto and having a first input, a second input and at least one of a first output and a second output is operable to combine an intermediate anticipation signal received at the first input with an intermediate anticipation signal received at the second input and to output the combined intermediate anticipation signal from at least one output.

8. The zero mechanism according to claim 7, wherein the combination is defined by an operator u, such that:

$$(g\_1, p\_1, z\_1) u (g\_r, p\_r, z\_r) = (g\_1 + (p\_1 \cdot g\_r), p\_1 \cdot p\_r,$$

18

$$(z\_1 \cdot z\_r \cdot (\sim g\_r), + p\_1 \cdot z\_r \cdot g\_r),$$

where g__1 and g__r are first and second generate terms, p__1 and p__r are first and second propagate terms, z__1 and z__r are first and second zero anticipation terms.

9. The zero mechanism according to claim 1 for an arithmetic unit providing an arithmetic result having N bits ordered from a lowest bit position to a highest bit position, wherein the array of cells comprises a plurality of sub-arrays, each sub-array being associated with a respective group of adjacent bit positions of the arithmetic result and generating an intermediate anticipation result signal, the intermediate anticipation result signal of a sub-array being forwarded directly to all sub-arrays associated with higher order bit positions.

10. The zero mechanism according to claim 9, wherein an output of a sub-array associated with a highest order bit position forms the zero anticipation signal.

11. The zero mechanism according to claim 10, wherein an output of a sub-array associated with an intermediate bit position forms an intermediate zero anticipation result in respect of bits up to an including the intermediate bit position.

12. The zero mechanism according to claim 1, wherein:

the arithmetic unit is operable to perform an arithmetic operation on operands A and B, where each operand comprises an ordered sequence of N bits, A(i) and B(i), respectively, for i=0 to N−1;

the arithmetic unit includes carry look-ahead adder for generating the result of the arithmetic operation; and the array of cells are formed by cells of the carry look-ahead adder.

13. The zero mechanism according to claim 12, wherein the array of cells is operable to output the zero anticipation signal before a final result of the arithmetic unit is ready.

14. The zero mechanism according to claim 1, where the arithmetic unit comprises a carry-save adder responsive to operands A and B for producing an ordered sequence of intermediate result signals by carry-free combination of operand A with operand B, the zero anticipation mechanism being connectable to the carry-save adder circuit for generating a zero anticipation signal based on an algebraic combination of carry-in signals from the carry-save adder with the ordered sequence of intermediate result signals for anticipating a zero magnitude result, the indication being not later than the result.

15. The digital system of claim 1 being a cellular telephone, further comprising:

an integrated keyboard connected to the processor via a keyboard adapter;

a display, connected to the processor via a display adapter;

radio frequency (RF) circuitry connected to the processor; and an aerial connected to the RF circuitry.

16. A method of anticipating a zero result of an arithmetic unit of a processing engine, the method comprising the steps of:

providing input data to the arithmetic unit;

generating intermediate result signals for the arithmetic unit;

producing an ordered sequence of intermediate anticipation signals by receiving the intermediate result signals from the arithmetic unit to form intermediate anticipation signals; and selectively forwarding and combining intermediate anticipation signals in accordance with a predetermined algorithm for generating a zero anticipation signal.

17. The method according to claim 16, wherein the step of selectively forwarding and combining comprises selectively forwarding and combining intermediate anticipation signals in a two dimensional array of cells with the cells selectively interconnected in first and second directions.

18. The method according to claim 17, further comprising the step of transmitting intermediate anticipation signals directly in a first direction from at least predetermined cells of the array.

19. The method according to claim 18, further comprising the step of forwarding intermediate anticipation signals after a delay in a second direction from at least predetermined cells of the array.

20. The method according to claim 19, further comprising the steps of:

combining intermediate anticipation signals from a first direction and a second direction in at least predetermined cells of the array, and passing the intermediate anticipation cells in one of the first and second directions for at least predetermined cells of the array.

21. The method according to claim 20, wherein the combination is defined by an operator u, such that:

$$(g\_1, p\_1, z\_1) u (g\_r, p\_r, z\_r) = (g\_1 + (p\_1 \cdot g\_r), p\_1 \cdot p\_r, (z\_1 \cdot z\_r \cdot (\sim g\_r)) + p\_1 \cdot z\_r \cdot g\_r),$$

where $g\_1$ and $g\_r$ are first and second generate terms, $p\_1$ and $p\_r$ are first and second propagate terms $z\_1$ and $z\_r$ are first and second zero anticipation terms.

22. A method of anticipating a zero result of an arithmetic unit of a processing engine, the method comprising the steps of:

grouping adjacent bit positions of the arithmetic unit into sections, with each section containing at least two bit positions;

providing input data to the arithmetic unit;

generating intermediate anticipation signals for each section;

grouping intermediate anticipation signals for each section; and combining the grouped intermediate signals for each section to form a zero anticipation signal.

* * * * *